United States Patent [19]
DiDomenico, Jr. et al.

[11] 4,332,440
[45] Jun. 1, 1982

[54] STRUCTURE OF DISPLAY DEVICES

[75] Inventors: Mauro DiDomenico, Jr., Bernardsville; Shobha Singh, Summit; LeGrand G. Van Uitert, Morristown, all of N.J.

[73] Assignee: Bell Telephone Laboratories, Incorporated, Murray Hill, N.J.

[21] Appl. No.: 131,080

[22] Filed: Mar. 17, 1980

[51] Int. Cl.³ .............................................. G02F 1/17
[52] U.S. Cl. ..................................... 350/357; 350/363
[58] Field of Search ................ 350/353, 357, 359, 363

[56] References Cited
U.S. PATENT DOCUMENTS

| | | | |
|---|---|---|---|
| 4,006,585 | 2/1977 | Tamaru | 350/357 |
| 4,019,809 | 4/1977 | Otake | 350/357 |
| 4,297,005 | 10/1981 | Johnson | 350/357 |

FOREIGN PATENT DOCUMENTS 54-7955  1/1979  Japan .................................. 350/357

*Primary Examiner*—James W. Davie
*Attorney, Agent, or Firm*—Walter G. Nilsen

[57] ABSTRACT

Display devices are described in which certain structural features prevent cross-talk effects between individual display elements. This ensures sharp delineation between individual display elements which promotes high contrast and sharp displays. These structural features are particularly advantageous for multiplexed display systems so as to simplify circuit arrangements and ensure sharp, high-contrast displays.

9 Claims, 3 Drawing Figures

STRUCTURE OF DISPLAY DEVICES

TECHNICAL FIELD

The invention relates to an electrochemical display device.

BACKGROUND OF THE INVENTION

The development of various modern electronic devices such as calculators, digital watches, microprocessors, etc., has increased the importance of reliable, low cost display devices. Many of these modern electronic devices store information or compute information which must be displayed for rapid and frequent reading. A display is made up of a number of display elements which can be individually controlled. Characters in a display are made up of clusters of display elements. Characters are formed (for example, individual integers or letters) by turning certain of the display elements "on" and others in the "off" position. A popular and well-known example is the seven segment numeric display shown in FIG. 1. Leaving certain of these display elements "on" and others in the "off" position results in the display of a particular digit.

It is desirable to reduce cross effects between display elements (here referred to as cross-talk effects) so as to maximize optical contrast and sharpness of the displayed characters. Where individual leads and electrodes are used for both the positive and negative electrodes of each element in the display, cross-talk effects and minimized but the number of leads in the display (two per element) is very large. For example, with a seven digit display and a seven segment numeric for each digit the number of individual display elements is 49. For individual positive and negative electrodes for each display element, this relatively simple display would require 96 individual leads. It is highly desirable to reduce the number of individual leads so as to simplify display fabrication and operation.

The number of leads can be reduced in a number of ways. For example, half of the electrodes (either all the positive electrodes or all the negative electrodes) can be eliminated by using one common electrode for the positive or negative electrode. The common electrode may be discrete islands of conductive material (often transparent for optical displays) electrically connected together either inside or outside the display cell. More convenient from a fabrication point of view is a large, usually planar electrode that serves all of the opposite discrete electrodes.

Although the use of one single electrode as either the positive or negative electrode reduces the number of leads substantially (from 96 to 49 for the 7 character, 7 element display discussed above), cross-talk effects are substantially increased with corresponding reduction in optical contrast and sharpness of the display.

Further reduction in the number of leads and individual circuits needed for a display are obtained using a multiplexing technique. A typical circuit arrangement is given in FIG. 2, assuming again a 7 character, 7 segment display as described above. The number of leads is now reduced to 14. Indeed, for most modern display circuits, some sort of multiplexing arrangement is used so that the number of leads is kept at a reasonable level. However, a multiplexing arrangement substantially increases the cross-talk effect in the display and thereby reduces optical contrast and sharpness of the display.

Techniques for reducing or eliminating cross-talk effects are described in many references including the following: "Liquid-Crystal Displays-Electro-Optic Effects and Addressing Techniques", by L. A. Goodman, *RCA Review* 35, page 613 (Dec. 1974); "Liquid Crystal Matrix Displays", by B. J. Lechner, *Proc. IEEE* 59, page 1566 (1971; "Multiplexing Liquid-Crystal Displays", by Paul Smith, *Electronics*, May 25, 1978, page 113; "Multiplexing LED Displays", by George Smith, Australian Electronics Eng. Sept. 1972, page 36; and "Multiplexing LED Digital Display Circuitry", by George Smith, *Electronics Australia*, April 1975, page 50.

These references describe various multiplexing systems where cross-talk effects are reduced or eliminated by adding additional circuit elements (diodes, capacitors, etc.). It is desirable to reduce or eliminate cross-talk effects without adding additional circuit elements which increase cost and complicate fabrication techniques.

SUMMARY OF THE INVENTION

The invention is a display device comprising electrodes and electrolyte in which the electrolyte is separated into a plurality of separate cells by electrical insulator material. The number of individual cells may vary over large limits. Often just dividing the display into two individual cells markedly reduces cross-talk effects. Dividing the display into cells that contain only one display element each essentially eliminates cross-talk effects. A larger number of cells are often used for fabrication convenience as for example where a fine mesh screen is used to separate individual cells. This is often the preferred type of cell because of ease of fabrication. The structural feature is useful for a variety of display devices including electrodeposition displays, electrochromic displays, quinone displays, etc. Such structural features make possible multiplexed displays with a close arrangement of display elements without cross talk but with a sharp display with good optical contrast.

DETAILED DESCRIPTION

Figure 1:
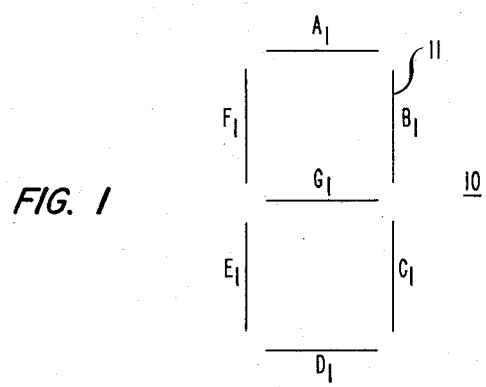
FIG. 1 shows a display pattern useful in a numerical display.

In its broadest aspects, the invention is an electrochemical-type display in which electrical insulating barriers divide the electrolyte into at least two individual segments. Often, there are more than two individual segments and the segments each contain one display element. Large members of individual segments may be used as where a fine mesh insulating screen is used. Use of such segmentation of the electrolyte prevents cross-talk effects especially where device structures useful for multiplexing are used.

The insulator material separating the various cells should be, in addition to reasonably good electrical insulator, unaffected by the electrolyte in the display device. Ceramic, glass and plastic (or polymer) insulator materials are useful. Low melting glazes and glasses are particularly convenient as are plastics that soften and adhere to the surface. Typical plastics are polyethylene, polypropylene, polybutadiene, nylon, etc.

This structural feature is useful for a variety of electrochemical display devices including quinone-type displays, electrochromic-type displays, electrodeposition-type displays (i.e., silver), etc. With multiplexed displays, it is highly desirable that the display exhibit a sharp threshold or non-linear property. A variety of electrolytes may be used in the display device. Generally, the electrolyte is electrically conductive, often an ionic conductor. The electrolyte is often composed of solvent and a dissolved salt which provides the ionic conduction. Water is usually avoided as a solvent because of electrolysis and the corrosive effects of aqueous solutions. Preference is given to solvents that are highly stable to the chemical and physical conditions present in the display device. In particular, it should not decompose under the influence of the voltages used in the device nor react destructively with the other ingredients in the display device. It should provide good solubility for the active substances used in the display device and the various electrolytes used. The solvent should preferably have a large liquid range above and below room temperature (preferably melting point less than $-40$ degrees C. and boiling point greater than 120 degrees C.).

The solvent should not easily give up protons (it should exhibit a very low concentration of dissociable protons) so as to prevent deterioration of contacts by reducing protons to elemental hydrogen. Proton concentrations should be at least two orders of magnitude less than that of pure water. It is preferred that the equivalent pKa value in water should be greater than 9 and more preferably greater than 12.

Typical solvents are dimethyl and diethyl sulfoxide, N,N-dimethyl and N,N-diethyl formamide, diethyl malonate, ethyl acetoacetic ester, ketones such as acetone, esters, ethers and alcohols with high pKa values. Also useful are organic carbonates such as propylene carbonate, organic lactones, organic nitriles such as acetonitrile, nitrohydrocarbons such as nitromethane, etc.

The solvents dimethylsulfoxide and N,N-dimethyl formamide are preferred because of high solubility for the electrolyte and stability. One of these solvents (dimethylsulfoxide) has the advantage of great solubility for the electrolyte. This solvent is preferred only when the temperature of operation does not fall below zero degrees C. Mixed solvents may be used (i.e., a mixture of dimethylsulfoxide and N,N-dimethyl formamide) to obtain the advantage of high solubility and extend the temperature range of operation by lowering the melting point.

Any electrolytic solution may be used which is compatible with the other ingredients in the display device. Alkali-metal halides such as NaCl, KBr, NaI are useful as are ammonium halides such as $NH_4I$. Quaternary ammonium salts (iodide, bromide and chloride) are also useful including for example tetrabutyl ammonium iodide tetrahexyl ammonium iodide and tetraheptyl ammonium iodide. Mixtures of the above salts (e.g., ammonium iodide and tetrabutyl ammonium iodide and tetrabutyl ammonium bromide) are also useful.

Active ingredients in the display device vary with the type of display. For silver deposition display devices, the device may contain silver iodide, silver bromide and/or silver chloride. Other silver compounds that might be useful are those that supply various silver-anion complex to the electrolyte solution. Typical silver-anion complexes are $Ag_3I_4^-$, $Ag_4I_5^-$, $Ag_2I_3^-$, $AgI_6^=$, $AgBr_2^-$, $AgCl_2^-$, etc.

Electrochromic displays may contain a variety of electrochromic material (vanadium oxide, indium oxide, tungsten oxide, molybdenum oxide, etc.) but the one usually used is tungsten oxide.

In quinone-type display devices, the active ingredient is an organic quinone. Numerous quinones are useful in the display device provided the ordinary state (uncharged) is colorless or light in color and the charged state is colored. Choice of organic quinone usually depends on color selection and device stability. Organic quinones with up to 100 carbon atoms are useful in display devices. Typical active organic materials are benzoquinone, naphthaquinone, anthraquinone, benzanthrenequinone, diphenoquinone, diphenylquinone, dibenzanthraquinone, phenanthrenequinones, benz[α]anthracene-7,12 dione and substituted variations of these materials. Other quinones are violanthrone, isoviolanthrone, perylenequinone, chrysenequinone, pyrenequinone, benzpyrenequinone, pyranthrone, flavanthrone and anthanthrone. The quinone groups (diketones) may be located in various places in the molecule consistent with stability (e.g., 1,2-anthraquinone, 1,4-anthraquinone and 9,10-anthraquinone). Other typical quinones are disclosed in a book (2 volumes) entitled *The Chemistry of the Quinonoid Compounds*, edited by Saul Patai, John Wiley and Sons, 1974. A large variety of substituents may be attached to the organic quinones provided the compounds remain stable and are compatible with the display device.

Excellent results have been obtained with organic quinones with three or four aromatic rings (e.g., anthraquinone, benzanthraquinone, etc.). A stabilizing effect is obtained by introducing certain substituents onto the aromatic (e.g., anthraquinone) structure. These substituents include hydrocarbon substituents such as other aromatic rings, aliphatic rings and straight chains and heterocyclic rings. Good results are obtained with alkane chains such as methyl, ethyl, tertiary butyl, etc. Typical compounds which are readily available, pleasing in color and stable are 2-tertiary butylanthraquinone, 2-ethylanthraquinone, and benz[α]anthracene-7,12 dione. In addition to organic quinone, the display device contains solvent, ionic compounds such as quaternary ammonium salts, ammonium halides, alkali halides, etc., and optionally an opacifier made up of insulator and/or semiconducting substance.

A discussion of the figures will serve to illustrate the invention. FIG. 1 shows a top view of a seven-segment digit display. By turning certain display elements or segments 11 "on" and some "off", certain numbers will be displayed. For example, leaving segments $A_1$, $B_1$ and $C_1$ "on" and the other segments "off" produces the number "7".

Figure 2:
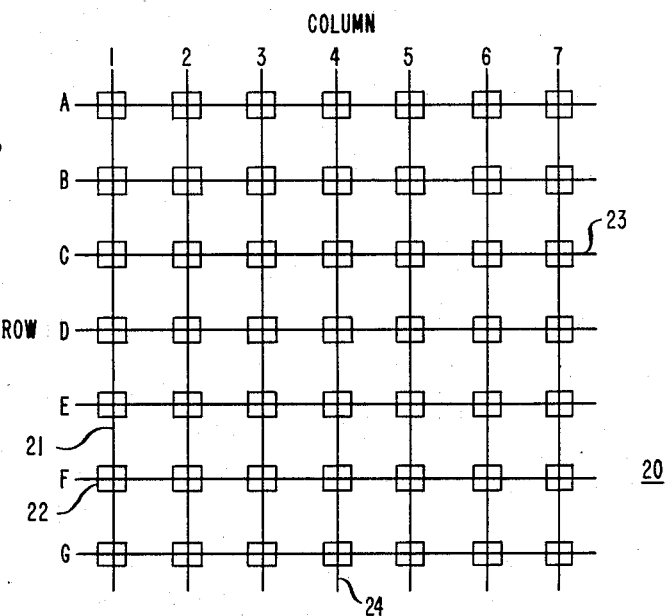
FIG. 2 shows a typical circuit arrangement for a 7 character, 7 element multiplexed display.

FIG. 2 shows a circuit arrangement for a typical multiplexing display 20. It applies to a seven-digit display with a seven-segment digit display for each digit. Conductors 21 connect various display elements 22 in a row or column. The rows (A,B,C, . . . ) refer to each segment or display element in one digit. The columns (1,2,3, . . . ) refer to each digit in the display. Although particular segments or display elements may be addressed in a variety of ways, they usually involve simultaneous signals on the two conductors crossing the display element or segment being addressed. For example, if segment $C_4$ (row C, column 4 or the lower right side of the 4th digit) is addressed, a signal is impressed on the conductor 23 of row C and the conductor 24 of the 4th column.

Figure 3:
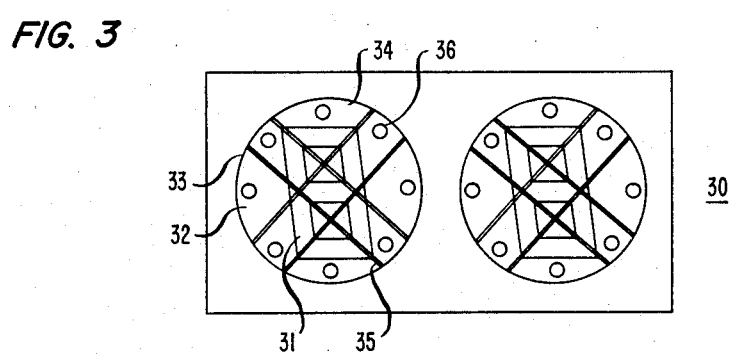
FIG. 3 shows a top view of a 2 character display with barriers between display elements.

FIG. 3 shows a two digit display 30 with a seven-segment digit display 31 used for each digit. The display is made up of one transparent electrode 32 either on the front or rear face and exposed to the electrolyte. The display elements forming the seven-segment display 31 make up the other electrode. This electrode is also in contact with the electrolyte. The individual digit display is covered with a transparent circular piece 33. The individual integer display is divided into cells 34 by insulating barriers 35. Individual fill holes 36 may be used to put electrolyte into the individual cells.

What is claimed is:

1. A display device comprising electrodes comprising transparent conducting material, display elements forming at least one character electrolyte comprising organic solvent and dissolved salt and active material, in which the active material changes color in response to an electrical signal and the active material consists essentially of at least one organic quinone selected from the group consisting of 2-tertiary butylanthraquinone, 2-ethylanthraquinone and benz[α]anthracene-7,12 dione characterized in that the electrolyte in said at least one character of the display device is separated into a plurality of separate cells by electrical insulator material so that electrical signal originating in one cell remains in that cell.

2. The display device of claim 1 in which the electrical insulator material is selected from the group consisting of ceramic, glass and polymer.

3. The display device of claim 1 in which the solvent for the electrolyte is selected from the group consisting of dimethyl sulfoxide, diethyl sulfoxide, N,N-dimethyl formamide, N,N-diethyl formamide, diethyl malonate, ethyl acetoacetic ester, acetone, propylene carbonate, acetonitrile and nitromethane.

4. The device of claim 3 in which the electrolyte comprises alkali-metal halide.

5. The device of claim 3 in which the electrolyte comprises ammonium halide.

6. The device of claim 3 in which the electrolyte comprises quaternary ammonium salt selected from the group consisting of chloride, bromide and iodide.

7. The device of claim 6 in which the electrolyte comprises an iodide selected from the group consisting of tetrabutyl ammonium iodides, tetrahexyl ammonium iodide and tetraheptyl ammonium iodide.

8. The device of claim 1 in which the display device is divided into two cells.

9. The device of claim 1 in which the number of separate cells is the same as the number of display elements with one element in each cell.

* * * * *